(12) United States Patent
Hobbs

(10) Patent No.: US 7,299,698 B2
(45) Date of Patent: Nov. 27, 2007

(54) VIBRATION TEST MODULE HAVING CONTROLLABLE VIBRATION ATTRIBUTES

(76) Inventor: Gregg K. Hobbs, 4300 W. 100th Ave., Westminster, CO (US) 80030-2481

( * ) Notice: Subject to any disclaimer, the term of this patent is extended or adjusted under 35 U.S.C. 154(b) by 191 days.

(21) Appl. No.: 11/054,725

(22) Filed: Feb. 10, 2005

(65) Prior Publication Data

US 2006/0174709 A1    Aug. 10, 2006

(51) Int. Cl.
*G01M 7/02* (2006.01)
(52) U.S. Cl. .............. 73/649; 73/662; 73/666
(58) Field of Classification Search .......... 73/649, 73/662, 663, 665, 666, 667, 668
See application file for complete search history.

(56) References Cited

U.S. PATENT DOCUMENTS

| | | | |
|---|---|---|---|
| 3,369,393 A | 2/1968 | Farmer | |
| 3,686,927 A | 8/1972 | Scharton | 73/71.6 |
| 4,164,151 A | 8/1979 | Nolan et al. | 73/663 |
| 4,181,028 A | 1/1980 | Talbott, Jr. | 73/665 |
| 4,735,089 A | 4/1988 | Baker et al. | 73/663 |
| 5,365,788 A | 11/1994 | Hobbs | 73/665 |
| 5,412,991 A | 5/1995 | Hobbs | 73/663 |
| 5,979,242 A * | 11/1999 | Hobbs | 73/663 |
| 6,062,086 A * | 5/2000 | Hess | 73/663 |
| 6,112,596 A * | 9/2000 | Hess | 73/663 |
| 6,422,083 B1 | 7/2002 | Hobbs | 73/663 |
| 6,446,508 B1 * | 9/2002 | Peterson et al. | 73/571 |
| 6,502,464 B1 | 1/2003 | Hobbs | 73/663 |
| 6,563,327 B1 * | 5/2003 | Leferink | 324/637 |
| 6,766,695 B2 | 7/2004 | Hwang | 73/663 |

* cited by examiner

*Primary Examiner*—Hezron Williams
*Assistant Examiner*—Jacques M. Saint-Surin
(74) *Attorney, Agent, or Firm*—Greenlee, Winner and Sullivan P.C.

(57) ABSTRACT

The present vibration test module enables a test engineer in the field of vibration test systems to precisely implement a vibration environment that is applicable to a wide range of applications and performance characteristics. The vibration test module comprises adjustable vibration shaping elements that collectively function to enable the user to program the frequency and magnitude of the vibrations that are produced by the vibration test system. This energy redistribution is accomplished by providing tuned vibration absorbers, consisting of a bouncing mass enclosed in a housing having walls that are elastic and/or spring mounted and/or adjustable in position, which enable the test engineer to precisely shape the frequency response of the vibrating system by causing broad band vibration to be generated in the vibration test system by the series of impacts of the mass with the walls of its enclosure.

31 Claims, 3 Drawing Sheets

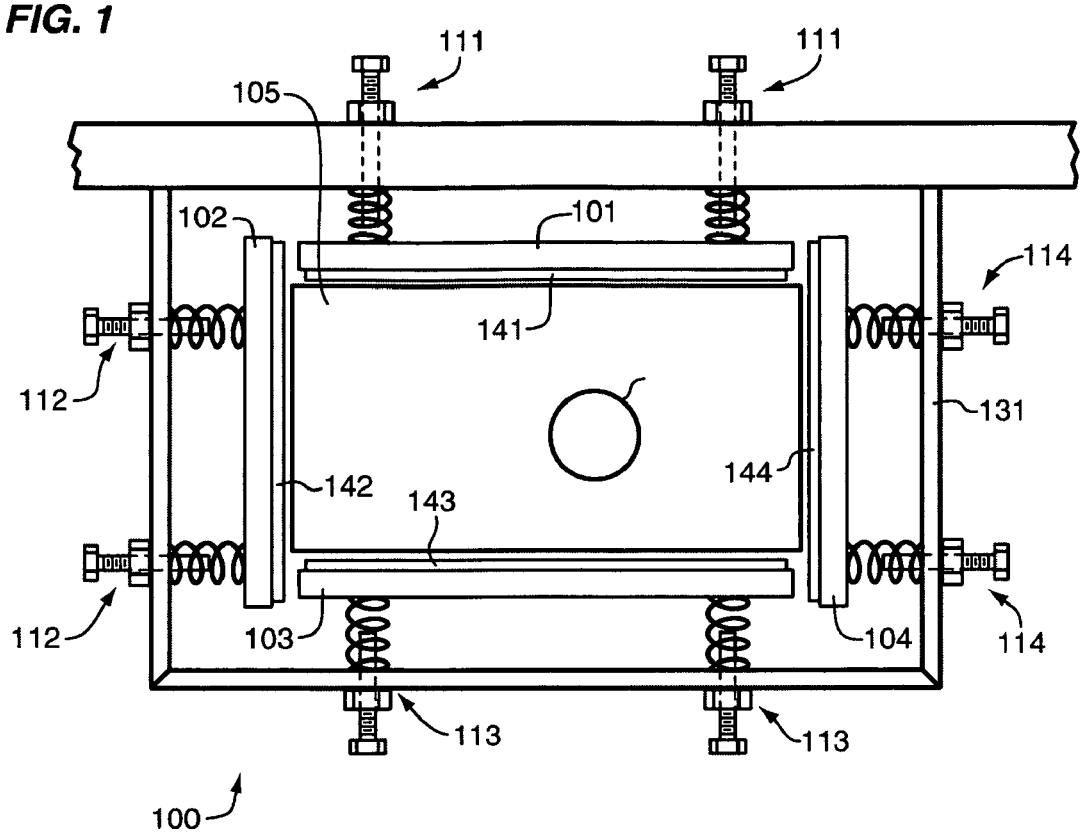
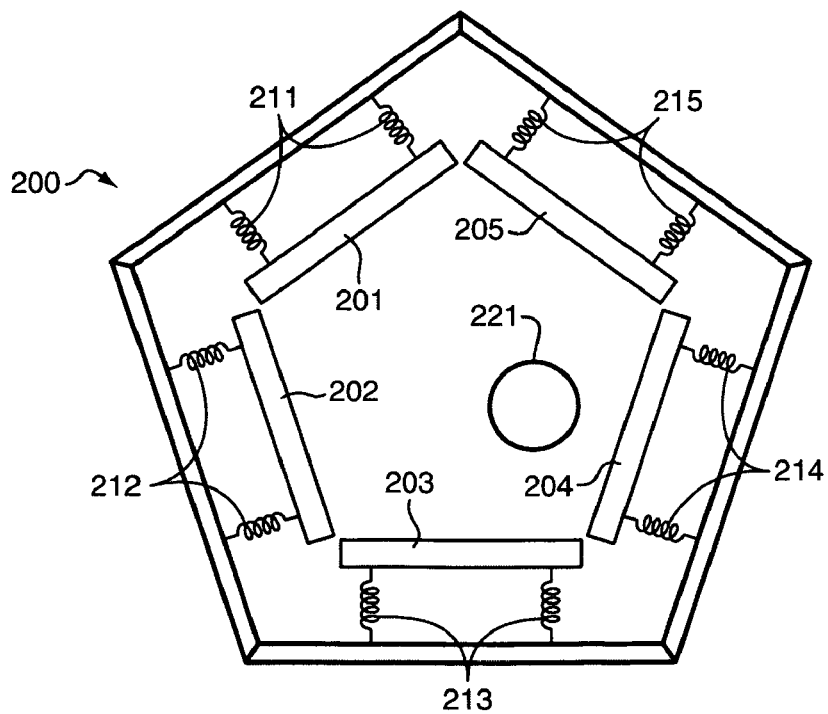

VIBRATION TEST MODULE HAVING CONTROLLABLE VIBRATION ATTRIBUTES

FIELD OF THE INVENTION

This invention relates to vibration test systems that are used to test the vibration resilience of products and, in particular, to an apparatus that enables the user to control vibration attributes of a vibration test system to thereby enable the test engineer to precisely create a desired vibration environment to emulate the environment that the product will encounter or to produce an environment that will bring out the same flaws as the real environment.

PROBLEM

It is a problem in the field of vibration test systems to create a test environment that reproduces the conditions that a product will encounter during its lifetime to thereby ensure that the conditions that a product encounters during shipping, installation and use do not cause it to fail in its operation. The laboratory equipment that is used for testing includes vibration test systems, commonly known as shaker tables, which emulate the vibration conditions encountered by the product. It is also common to locate the shaker table within a thermal chamber to incorporate thermal cycling of the product into the vibration test. Unfortunately, these vibration test systems are not presently able to be selectively activated at a precisely defined vibration amplitude and frequency response. Therefore, it is impossible to reproduce, in a laboratory environment, the real world conditions that a product will encounter.

The basic shaker table includes a platform upon which the product is mounted. The platform is supported on flexible supports that permit the vibration of the table freely in all directions, independent of the environment. The shaker table generates vibration in six axes by providing either pneumatically driven or mechanically driven actuators, termed exciters or vibrators, which produce an impact to initiate the vibrations. The platform couples the vibrations from the actuators to the product. The typical actuator is an impact device that produces forces of high magnitude but very short duration, typically driven by air pressure. There are two effects that result from this input: the repeated impacts generate a line spectrum (equally spaced lines) in the spectral density domain, the shaker table is set into a quasi-resonance condition and all of its modes of vibration are excited. As a result, the spectral density of the shakers is not uniform and can vary by six or more decades. These variations are unacceptable for highly accelerated testing or for simulation applications.

The physical properties of the shaker table components cause the shaker table to respond to the different frequencies in the impact spectrum in different ways. The physical properties of the shaker table components typically resonate with certain vibration frequencies and suppress other vibration frequencies to result in selected modes of vibration. For example, resonation results in the vibrations remaining for a relatively long time compared to the duration of the input pulse, while suppression results in the quenching of the vibration in a relatively short time. The modes of vibration of the shaker table which are excited are also a function of the location, orientation and nature of the actuators as well as the dimensions and properties of the platform. Thus, by designing the shaker table to have relatively low resonant frequencies, the spectral response of the vibration test system can be shifted to fill up the low frequency end of the spectrum, but there is a tendency to have significant variation in spectral density.

In addition, dampers are frequently used to shape the spectral response of the vibration test system and these can use a "bouncing ball" mass that is enclosed in a housing to shape the input pulses generated by the actuator. The enclosure is typically a chamber of fixed dimensions and shape, with the bouncing ball either being a solid material or coated with a programmer to change the bandwidth of the vibration frequencies that are produced. A problem with the use of a programming coating on the bouncing ball or walls of the enclosure is that the coating causes heating due to the internal hysteretic damping, thereby varying the change in the bandwidth of the vibration frequencies that are produced in a manner that is unpredictable.

This shaker table architecture is well known and the great difficulty facing the test engineers in this field is the implementation of the shaker table in a manner to precisely produce the desired vibration conditions in terms of the presence of selected vibration frequencies and regulation of their magnitude. There are obviously numerous variables, each of which affects the magnitude and frequency of the vibrations that are produced. These variables include but are not limited to: number of actuators, actuator placement, actuator characteristics, frequency of actuator operation, physical coupling of the actuator to the shaker table platform, coupling of the product to the shaker table platform, damping elements included in the shaker table, dimensions of the shaker table, shaker table implementation, including materials and intervening structures. A further complicating factor is that these variables can also be interactive, in that the variation of one variable can impact the effects produced by another variable. Thus, the design of a shaker table is a non-trivial task and typically represents a compromise that produces a crude emulation of the desired vibration characteristics. The quest for accuracy in this field is ongoing and has been relatively unsuccessful to date.

The following recitation of typical shaker table implementations represents a sampling of the many attempts to address the above-noted problem.

U.S. Pat. No. 3,369,393, issued to E. W. Farmer, discloses a light weight, stiff test fixture that comprises upper and lower plates that are separated by perpendicular vertical walls. The walls are arranged on a horizontal grid pattern to form cells that can have different horizontal dimensions. The lower plate is attached to an actuator that provides the impact to generate the shaking motion of the table. The upper plate provides the mounting surface on which the product is mounted. This fixture provides a dynamically stiff coupling between the upper and lower plates over a frequency range of interest.

U.S. Pat. No. 3,686,927, issued to Terry D. Shannon, discloses a light weight, flexible test fixture that comprises upper and lower plates that are coupled by a system of flexible members. The lower plate is attached to an actuator that provides the impact to generate the shaking motion of the table. The upper plate provides the mounting surface on which the product is mounted. The flexible members are interposed between the upper and lower plates to provide a desired dynamic coupling function between the upper and lower plates over a frequency range of interest. The flexible members can be systems of wires, beams, plates, trusses and the like.

U.S. Pat. No. 4,164,151, issued to Douglas C. Nolan et al, discloses a shaker table that has a hollow top. The table is comprised of a plurality of compartments that contain projectiles, such as heavy balls, that impact the walls of their respective compartments to generate random shocks. The table rests on an insulated base, which in turn rests on a vibration machine. The table top is bolted through the insulated base to the vibration machine.

U.S. Pat. No. 4,181,028, issued to C. F. Talbott, Jr, describes a vibration system that consists of a driving structure and a driven structure, which are both coupled to a visco-elastic structure that transmits the vibrations from the driving structure to the driven structure. There are a number of ways of clamping the driving and driven structures as well as varying the stiffness and damping characteristics of the visco-elastic structure.

U.S. Pat. No. 4,735,089, issued to Richard L. Baker, discloses a shaker table that comprises upper and lower plates that are interconnected by an intervening plurality of damping layers. The damping layers comprise laminated layers of honeycomb material bonded together by a flexible adhesive to thereby provide dynamic coupling.

U.S. Pat. Nos. 5,365,788 and 5,412,991, issued to Gregg K. Hobbs, disclose a stiff shaker table that comprises a stiff plate having multiple internal weight reducing cavities.

U.S. Pat. Nos. 6,502,464 and 6,422,083, issued to Gregg K. Hobbs, disclose tuned energy redistribution systems which precisely control the amplitude of vibrations in a vibrating system by using tuned vibration absorbers, consisting of a vibrating mass and a vibration stop. The tuned vibration absorbers shape the frequency response of the vibrating system by responding to frequencies near their natural frequency of vibration and producing a vibration impact via the vibrating mass impacting the vibration stop.

U.S. Pat. No. 6,766,695, issued to Chung S. Hwang, discloses a HALT/HASS fixturing table for generating secondary vibration using balls which move along a set of multi-axis rails formed in a lower panel of the fixturing table.

Screening Systems Inc. manufactures a modally rich, heavily damped six axis system. This shaker table is flexible and responds to a series of impacts from pneumatically driven actuators. This system is designed to generate a midrange vibration spectrum which is strong from about 200 Hz to about 800 Hz. It has little lower and higher vibration frequencies and therefore cannot excite the very low and very high vibration frequencies of the product under test. Also, this system has little or no spectrum control over most of the frequency range and cannot effectively utilize rigid fixtures as the system is made to be flexible.

QualMark Corporation manufactures a broad band six axis vibration system that is inertially actuated by pneumatically driven actuators. This vibration system produces vibration frequencies at the repetition rate of the vibrators (in the less the 60 Hz range) and all harmonics of the repetition rate up to about 800 Hz where table resonances start to be significant and where the vibration frequencies then increase by several orders of magnitude. The vibration frequency spectra that are produced by this vibration system are strongest from about 800 Hz up to about 5,000 Hz. A reasonable vibration frequency spectra below 800 Hz exists, but the magnitude of this vibration frequency spectra is inadequate to excite the low frequency resonances of the product under test to a desirable level. This vibration system also has little of no spectral control over most of the vibration frequency range.

Team Corporation manufactures a 'Cube' vibration system that is servo-hydraulically actuated. The bandwidth of the vibration frequencies that are produced by this vibration system is approximately from 0-200 Hz. Due to the character of the servo-hydraulic actuation and the oil column resonance, higher frequencies of vibration are not possible. The servo-hydraulic system concept has several desirable characteristics, including very large magnitude forces and large displacements. These vibration systems also have spectrum control to a large degree.

Thus, while there are a number of variations of shaker tables, each implementation presents limitations that prevent the test engineer from effecting precise control over the vibration frequencies and magnitudes to thereby precisely emulate the environment that the product under test will encounter or the environment desired for simulation or stimulation.

SOLUTION

The above described problems are solved and a technical advance achieved by the present Vibration Test Module Having Controllable Vibration Attributes (termed "vibration test module" herein) which functions to precisely control the amplitude of vibrations in a vibration test system. The vibration test system typically has a resonant frequency or other vibration frequency modes that are either undesirable or of excessive amplitude. The present vibration test module functions to redistribute the vibrational energy from these undesirable frequencies to other selected frequencies, such as by spreading the vibration frequencies out over a wide band of frequencies. The present vibration test module functions in any vibrating system and is of particular significance in the field of vibration test systems.

The present vibration test module enables a test engineer in the field of vibration test systems to precisely implement a vibration environment that is applicable to a wide range of applications and performance characteristics. The vibration test module comprises adjustable vibration shaping elements that collectively function to enable the user to program the frequency and magnitude of the vibrations that are produced by the vibration test system. This energy redistribution is accomplished by providing tuned vibration absorbers, consisting of a bouncing mass enclosed in a housing having walls that are elastic and/or spring mounted and/or adjustable in position, which enable the test engineer to precisely shape the frequency response of the vibrating system by causing broad band vibration to be generated in the vibration test system by the series of impacts of the mass with the walls of its enclosure.

For a vibration test system which produces random vibrations to test the vibration resilience of products mounted on a shaker table, the vibration test module extracts energy from the vibration test system at the resonant frequency of the vibration test module and then redistributes it over a very broad bandwidth which is determined by the characteristics of the walls: the elastic characteristics and/or spring characteristics and/or position relative to the other walls. Thus, the vibration test module can reduce resonances and fill in the low frequency end of the spectrum and, by design, the high frequency end of the spectrum can also be filled.

BRIEF DESCRIPTION OF THE DRAWING

FIG. 1 illustrates a cross sectional view of the overall architecture of the present vibration test module;

FIG. 2 illustrates an alternative embodiment of the present vibration test module;

DETAILED DESCRIPTION OF THE DRAWING

Vibration Test Systems

Figure 3A:
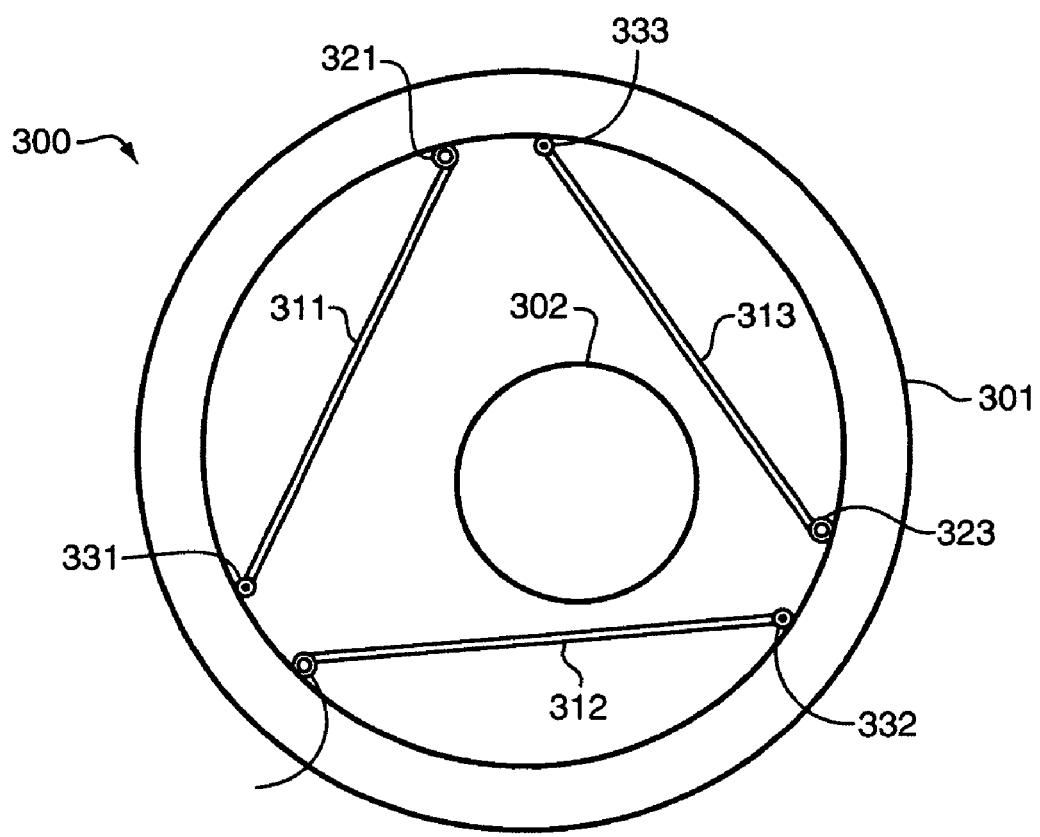
FIG. 3 illustrates a cross section of a mass for use in the present vibration test module.

The field of vibration test systems uses the concept of controllably generating vibrations of predetermined frequency and magnitude to emulate the vibration conditions encountered by a product during its life cycle to determine whether the product is susceptible to failure due to vibration. There are numerous vibration test modes that are used in the vibration test industry. Among these are the Highly Accelerate Life Tests (HALT) that use very high levels of vibration excitation to excite all modes of vibration in the product under test in order to find design and process weak links. Additionally, Highly Accelerated Stress Screens (HASS) comprise vibration tests that use high levels of excitation to find process problems. What is needed for general HALT and HASS vibration applications is a vibration test system that generates low frequency (0-200 Hz) vibrations for some applications, high frequency (200-10,000 Hz) vibrations for other applications and broad band vibration frequencies (0-10,000 Hz) for still other applications.

In a typical vibration test system, the shaker table can be excited by any of a number of actuators. For example, rotary ball vibrators can be used as the source of input forces to generate the vibrations. The rotary ball type of vibrator consists of a chrome steel ball which rotates in a circular migratory race, powered by a stream of compressed gas to thereby control the rate of rotation of the ball in the race. The rotary ball vibrators generate a rotating force vector which is sinusoidal in each of two perpendicular directions in the plane of the rotating vector. This produces a line in the vibration frequency spectrum for a given direction. This vibration spectrum can be spread out over a broad bandwidth by the bouncing ball contained in the adjustable enclosure of the present vibration test module. In addition, a number of rotary ball vibrators can be used in a vibration test system to generate different vibrations in different axes and these ball vibrators can also be run at different rates of rotation to generate a vibration spectrum over a wide spectrum.

In order to better understand the operation of the present vibration test module, a brief description of the art of vibration dampers is provided.

Prior Art Un-Tuned & Tuned Dampers

In the field of vibration control, both tuned and un-tuned dampers are well known. Un-tuned dampers typically change elastic strain energy into heat by one or more means. In one typical application, a mass is attached to a crankshaft via a fluid coupling or by a frictional coupling. When the crankshaft angular velocity increases or decreases, the mass continues in motion and generates a force in a direction that is opposite to the change. Energy is lost due to heat generated and then transferred to the surroundings. This reduces torsional vibrations that would fatigue the crankshaft.

In tuned dampers, the operation is not truly damping, but the operation of the tuned damper simply changes the dynamic response of the overall system by changing the resonant frequencies of the overall system. This effectively reduces the resonance of the overall system at the selected frequency by making that frequency not a resonant frequency. In the crankshaft example used above, a tuned damper is implemented as a pendulum attached to the crankshaft, with the centrifugal force, as it varies with rotational speed, causing the pendulum to swing back and forth. The damper stays tuned to the disturbances caused by disruptive forces in the crankshaft, and is therefore self-tuning.

Programmers

The operation of the tuned energy redistribution systems can be modified by the use of programmers which comprise coatings that have predetermined physical characteristics that change the bandwidth of the vibration frequencies that are produced. For example, the vibration frequency spectrum that results from the shock pulse generated by a tuned energy redistribution system attached to a shaker table can be shaped by placing a programmer between the impacting mass and the shaker table. For this purpose, Delrin® acetal resins are the preferred material although other materials, such as those used to manufacture roller blade wheels, are also appropriate due to their resiliency. These materials typically generate more low frequency vibrations than the Delrin materials due to the fact that they are softer materials. The Delrin acetal resins produced by Dupont are crystalline thermoplastic homopolymers made by the polymerization of formaldehyde. The beneficial characteristics of Delrin acetal resins are: high mechanical strength and rigidity, high fatigue endurance, high resistance to repeated impact, low coefficient of friction, and excellent dimensional stability. The physical dimensions and material properties of the programmer determine the stiffness and therefore the pulse shape, which need not be half sine.

Vibration Test Module Architecture

FIG. 1 illustrates a cross sectional view of the overall architecture of the present vibration test module and FIG. 2 illustrates a cross sectional view of an alternative architecture of the present vibration test module. As illustrated in FIG. 1, a plurality of walls 101-106 (105 and 106 not shown) are connected to the six-sided housing 131 of the vibration test module 100 by means of one or more springs (or sets of springs), 111-116, respectively (with springs 115-116 not shown in this cross-section view). A mass 121 is enclosed within the vibration test module 100, located within the space defined by walls 101-106. One or more of the walls 101-106 can be coated with a programmer material 141-146 to controllably change the bandwidth of the vibration frequencies that are produced. While a six-sided housing 131 of rectangular shape is illustrated in FIG. 1, the architecture of the vibration test module is not limited to this geometry of housing and other geometries can be used to produce vibrations in different directions.

FIG. 2 illustrates a cross sectional view of an alternative architecture of the present vibration test module. As illustrated in FIG. 2, a plurality of walls 201-207 (207 and 207 not shown in this cross-section view) are connected to the seven-sided housing 231 of the vibration test module 200 by means of one or more springs (or sets of springs), 211-217, respectively (with springs 215-217 not shown in this cross-section view). A mass 221 is enclosed within the vibration test module 200, located within the space defined by walls 201-207.

Figure 3B:
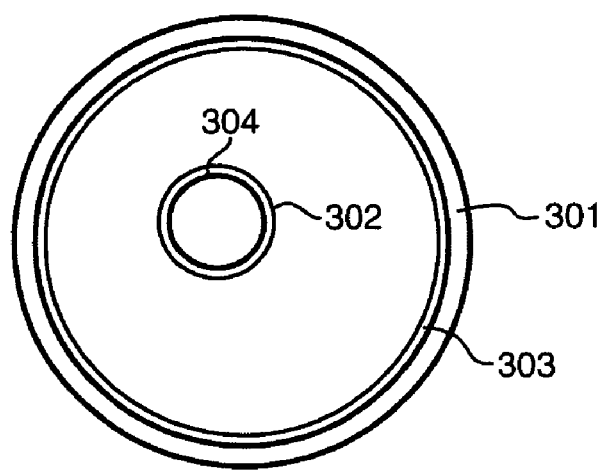

FIGS. 3A and 3B illustrate a cross section of a mass 300 for use in the present vibration test module 100. The mass 121/221 shown in FIGS. 1 and 2 can be hollow and can contain another mass 302 within its cavity so secondary impacts can occur. The interior mass 302 can be supported on a spring(s) and thereby further shape the shock pulse. As shown in FIG. 3A, one embodiment comprises an outer ball 301 that has a cavity inside thereof, which includes a plurality 311-313 of hinged spring plates. Each of the spring plates 311-313 are attached to the inner surface of the outer ball 301 via a hinge 321-323 and also include a wheel or other movable element 331-333 at the other end thereof to enable smooth movement of the spring plates along the inner surface of the outer ball 301. Also included in the outer ball 301 is an inner ball (or other shaped mass) 302 which is enclosed by the spring plates 311-313 and functions to impact these spring plates 311-313 as the outer ball bounces. Alternatively, the spring plates 311-313 can be eliminated as shown in FIG. 3B and the inner ball 302 can be sized to have an outer diameter that is less than the inner diameter of the outer ball 301, but these dimensions should be close to minimize the range of motion of the inner ball 302 within the outer ball 301. Furthermore, the inner surface of the outer ball 301, and/or the outer surface of the inner mass 302, can be coated with a programmer material 303, 304, respectively, to controllably change the bandwidth of the vibration frequencies that are produced.

Figure 4:
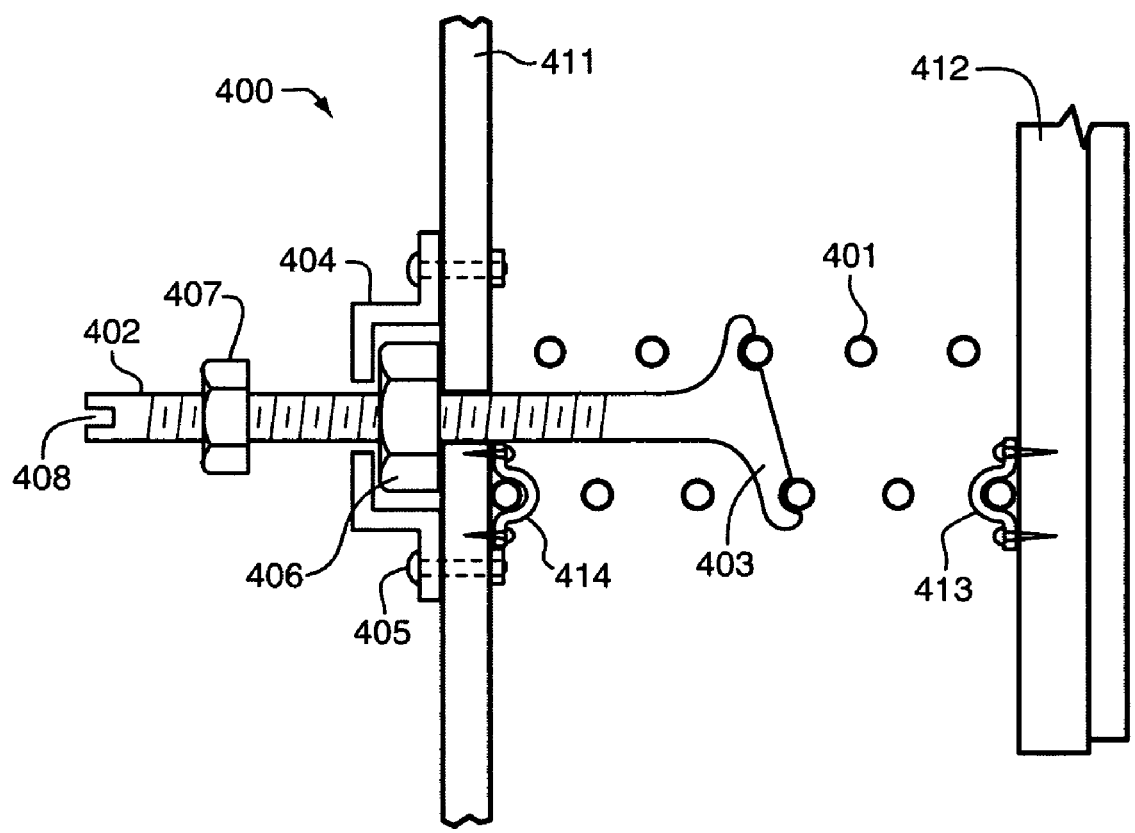
FIGS. 4 and 5 illustrate details of a spring apparatus used in the vibration test module.
Figure 5:
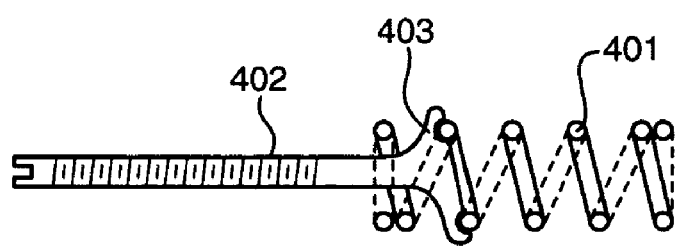

FIGS. 4 and 5 illustrate in cross-section view the details of a spring apparatus used in the vibration test module. These figures illustrate an implementation of a tunable spring which consists of a uniformly would coil spring 401 which is attached (via clamp 414) at a first end to a corresponding side 411 of the housing 400 and at a second end to a wall 412 (via clamp 413) enclosed by the housing 400. A spring rate adjuster mechanism is provided to control the stiffness of the spring. The spring rate adjuster mechanism consists of an externally adjustable rod 402 which has formed on one end thereof a coil receiving pad 403 which functions to engage a coil of the coil spring 401 to thereby block off the coils of the coil spring 401 that are located between the coil receiving pad 403 and the housing 400 of the vibration test module 100. The spring rate adjuster mechanism includes a plate 404, that is affixed to the housing 400 via bolts 405 or other fastening mechanism, to enclose a nut 406 through which is threaded the adjustable rod 402. A second nut (jamb nut) 407 is threaded on to the externally adjustable rod 402 and is used to lock the position of the externally adjustable rod 402 once it is properly positioned. The externally adjustable rod 402 typically contains a slot 408 in the end thereof to enable a user to turn the externally adjustable rod 402, moving the coil receiving pad 403 in or out to capture more or fewer of the coils in locked position, thereby changing the spring rate. Once the adjustment is completed, the jamb nut 407 is tightened on to the plate 404 to prevent rotation of the externally adjustable rod 402.

Vibration Test Module Characteristics

The present vibration test module enables a test engineer in the field of vibration test systems to precisely implement a vibration environment that is applicable to a wide range of applications and performance characteristics. The vibration test module comprises adjustable vibration shaping elements that collectively function to enable the user to program the frequency and magnitude of the vibrations that are produced by the vibration test system. This energy redistribution is accomplished by providing tuned vibration absorbers, consisting of a bouncing mass enclosed in a housing which uses a set of walls to enclose the bouncing mass, where the walls are elastic and/or spring mounted and/or adjustable in position. This architecture enables the test engineer to precisely shape the frequency response of the vibrating system by causing broad band vibration to be generated in the vibration test system by the series of impacts of the mass with the walls of its enclosure.

In the present vibration test module, the walls of the bouncing mass enclosure can be constructed out of an elastic material and/or attached via springs to the housing of the vibration test module to thereby provide a vibration spectrum redistribution function. In this first case, the materials used to manufacture the walls can be selected on a per wall basis to customize the vibration response of the vibration test module. The vibration characteristics of the walls are a function of the elasticity of the material used to construct the walls of the vibration test module. In addition, the springs of the vibration test module used to interconnect the walls to the housing of the vibration test module provide another variable in setting the vibration characteristics of the vibration test module. Since springs have little hysteretic damping, their response to vibrations is consistent and the springs can be modified to change the vibration characteristics of the vibration test module. The springs determine the shape of the vibration pulses that are generated by impacts of the bouncing mass on the walls of the enclosure, which determines the bandwidth of the spectra. In addition, a non-linear spring can be used so that an external adjustment can change the spring rate and shape the bandwidth (cutoff). In addition, the springs supporting the different walls can have different characteristics so the bandwidths generated in each dimension differ. Finally, the position and spacing of the walls of the vibration test module determine the frequency and intensity of the impulses caused by the bouncing mass impacting the walls of the vibration test module. The distance between the walls can be individually adjusted to thereby change the free flight distance between impacts. In addition, the walls can be positioned at any angle to therefore distribute the vibrational energy to any axis over any bandwidth. All of these elements provide a suite of tools that the test engineer can use to adjust the operating characteristics of the vibration test module.

SUMMARY

The vibration test module comprises adjustable vibration shaping elements that collectively function to enable the user to program the frequency and magnitude of the vibrations that are produced by the vibration test system. This energy redistribution is accomplished by providing tuned vibration absorbers, consisting of a bouncing mass enclosed in a housing having walls that are elastic and/or spring mounted and/or adjustable in position, which enable the test engineer to precisely shape the frequency response of the vibrating system by causing broad band vibration to be generated in the vibration test system by the series of impacts of the mass with the walls of its enclosure.

What is claimed:

1. A vibration test module that is operational in a vibrating system to produce vibrations at a predetermined set of frequencies, said vibration test module comprises: enclosure means, directly connected to said vibrating system at a predetermined location, for vibrating in response to vibration of said vibrating system, comprising: a housing of predetermined geometric share, a plurality of walls, located within said housing and arranged in a predetermined orientation with respect to each other; wall flexibility means; and mass means enclosed in a volume created by said plurality of walls, for impacting said walls when said vibrating system imparts vibrations to said vibration test module wherein said wall flexibility means shape a vibration spectrum of said impact and wherein said wall flexibility means comprises: means for adjusting a spectral response of said vibration test module, comprising at least one of: a spring means interconnecting at least one of said walls with said housing, or a wall position adjustment means for adjusting a spacing among said walls.

2. The vibration test module of claim 1 comprising said spring means and wherein said spring means comprises: at least one spring having first and second ends, said first end connected to said wall and said second end connected to said housing.

3. The vibration test module of claim 2 wherein said spring means further comprises: a non-linear spring.

4. The vibration test module of claim 2 wherein said spring means further comprises: spring rate adjuster means for controlling the stiffness of said at least one spring.

5. The vibration test module of claim 4 wherein said spring rate adjuster means comprises: adjustable rod means, having formed on one end thereof a coil receiving pad which functions to engage a coil of said spring to thereby block off the coils of the spring that are located between the coil receiving pad and said housing.

6. The vibration test module of claim 5 wherein said spring rate adjuster means further comprises: fastener means for attaching said adjustable rod means to said housing while enabling adjustment of a position of said adjustable rod means coaxial with said spring.

7. The vibration test module of claim 6 wherein said fastener means comprises: nut means threadable on to a portion of said adjustable rod means that extends through said housing; plate means for positioning said nut means against said housing; and jamb nut means threadable on to a portion of said adjustable rod means that extends through said housing and said nut means for preventing movement of said adjustable rod means.

8. The vibration test module of claim 1 further comprising: elastic material means forming said walls.

9. The vibration test module of claim 8 wherein said elastic material comprises: programmer means affixed to a surface of said wall for receiving impacts of said mass means.

10. The vibration test module of claim 1 wherein said mass means comprises: geometrically shaped mass having a hollow interior; interior mass means located within and freely moving within said hollow interior for impacting an interior surface of said geometrically shaped mass.

11. The vibration test module of claim 10 wherein said mass means further comprises: programmer means affixed to said interior surface of said geometrically shaped mass for receiving impacts of said interior mass means.

12. The vibration test module of claim 10 wherein said mass means further comprises: programmer means affixed to an exterior surface of said interior mass means for receiving impacts of said interior mass means with said interior surface of said geometrically shaped mass.

13. The vibration test module of claim 10 wherein said mass means further comprises: at least one spring plate means affixed to said interior surface of said geometrically shaped mass for receiving impacts of said interior mass means.

14. The vibration test module of claim 1 that is operational in a vibrating system to produce broadband vibrations, and wherein said mass means are rotary.

15. The vibration test module of claim 14 comprising a spring means interconnecting at least one of the said walls with said housing.

16. The vibration test module of claim 14 comprising wall position adjustment means for adjusting a spacing among said walls.

17. The vibration test module of claim 15 wherein said spring means comprises: at least one spring having first and second ends, said first end connected to said wall and said second end connected to said housing.

18. The vibration test module of claim 17 wherein said spring means further comprises: a non-linear spring.

19. The vibration test module of claim 17 wherein said spring means further comprises: spring rate adjuster means for controlling the stiffness of said at least one spring.

20. The vibration test module of claim 19 wherein said spring rate adjuster means comprises: adjustable rod means, having formed on one end thereof a coil receiving pad which functions to engage a coil of said spring to thereby block off the coils of the spring that are located between the coil receiving pad and said housing.

21. The vibration test module of claim 20 wherein said spring rate adjuster means further comprises: fastener means for attaching said adjustable rod means to said housing while enabling adjustment of a position of said adjustable rod means coaxial with said spring.

22. The vibration test module of claim 21 wherein said fastener means comprises: nut means threadabie on to a portion of said adjustable rod means that extends through said housing; plate means for positioning said nut means against said housing; and jamb nut means threadabie on to a portion of said adjustable rod means that extends through said housing and said nut means for preventing movement of said adjustable rod means.

23. The vibration test module of claim 14 further comprising elastic material means which comprises: programmer means affixed to a surface of said wall for receiving impacts of said mass means.

24. The vibration test module of claim 23 wherein said elastic material comprises: programmer means affixed to a surface of said wall for receiving impacts of said mass means.

25. The vibration test module of claim 14 wherein said rotary mass means comprises: geometrically shaped mass having a hollow interior; interior mass means located within and freely moving within said hollow interior for impacting an interior surface of said geometrically shaped mass.

26. The vibration test module of claim 25 wherein said rotary mass means further comprises: programmer means affixed to said interior surface of said geometrically shaped mass for receiving impacts of said interior mass means.

27. The vibration test module of claim 25 wherein said rotary mass means further comprises: programmer means affixed to an exterior surface of said interior mass means for receiving impacts of said interior mass means with said interior surface of said geometrically shaped mass.

28. The vibration test module of claim 25 wherein said rotary mass means further comprises: at least one spring plate means affixed to said interior surface of said geometrically shaped mass for receiving impacts of said interior mass means.

29. The vibration test module of claim 1 comprising both said spring means and said wall position adjustment means.

30. The vibration test module of claim 29 further comprising: elastic material means forming said walls.

31. The vibration test module of claim 30 wherein said elastic material comprises: programmer means affixed to a surface of said wall for receiving impacts of said mass means.

* * * * *